United States Patent
Chen (10) Patent No.: US 9,170,621 B2
(45) Date of Patent: Oct. 27, 2015

(54) POWER SUPPLY DEVICES AND CONTROL METHOD THEREOF

(75) Inventor: Po-Chuan Chen, New Taipei (TW)

(73) Assignee: WISTRON CORP., New Taipei (TW)

( * ) Notice: Subject to any disclaimer, the term of this patent is extended or adjusted under 35 U.S.C. 154(b) by 865 days.

(21) Appl. No.: 13/368,576

(22) Filed: Feb. 8, 2012

(65) Prior Publication Data
US 2013/0043929 A1 Feb. 21, 2013

(30) Foreign Application Priority Data
Aug. 19, 2011 (TW) .............................. 100129694 A (51) Int. Cl.
| | |
|---|---|
| H02J 7/00 | (2006.01) |
| H02J 7/14 | (2006.01) |
| G06F 1/26 | (2006.01) |
| G06F 1/30 | (2006.01) |
| G06F 1/32 | (2006.01) |
| H02J 7/34 | (2006.01) |
| H02J 9/00 | (2006.01) |

(52) U.S. Cl.
CPC . *G06F 1/263* (2013.01); *G06F 1/30* (2013.01); *G06F 1/3203* (2013.01); *H02J 7/345* (2013.01); *H02J 9/005* (2013.01)

(58) Field of Classification Search
USPC .......... 327/535; 307/64, 65, 66, 110, 150, 70, 307/71, 9.1; 320/109, 166, 116, 117, 124, 320/132, 150, 167
See application file for complete search history.

(56) References Cited

U.S. PATENT DOCUMENTS

| | | | | |
|---|---|---|---|---|
| 4,461,003 A | * | 7/1984 | Tamaki | ........................... 714/22 |
| 4,587,640 A | * | 5/1986 | Saitoh | ........................... 365/229 |
| 5,375,246 A | * | 12/1994 | Kimura et al. | ................ 365/229 |
| 5,422,559 A | | 6/1995 | Hall et al. | |
| 5,650,974 A | | 7/1997 | Yoshimura | |

(Continued)

FOREIGN PATENT DOCUMENTS

| | | |
|---|---|---|
| CN | 111844 | 11/1995 |
| TW | 339180 | 8/1998 |

(Continued)

OTHER PUBLICATIONS

English language translation of abstract of TW 339180 (published Aug. 21, 1998).

(Continued)

*Primary Examiner* — Edward Tso
*Assistant Examiner* — Alexis A Boateng
(74) *Attorney, Agent, or Firm* — McClure, Qualey & Rodack, LLP (57) ABSTRACT

A power supply device is provided. The power supply device provides a maintenance voltage at an output terminal to a system chip of a system and includes a first battery, a capacitor, a charging circuit, and a monitoring circuit. The first battery provides a battery voltage. The capacitor stores a capacitor voltage. The charging circuit is coupled to the capacitor. The monitoring circuit detects whether the battery voltage is less than a first threshold and whether the capacitor voltage is larger than a second threshold and generates a control signal according to the determination result. When the monitoring circuit detects that the battery voltage is less than the first threshold and the capacitor voltage is not larger than the second threshold, the monitoring circuit asserts the control signal to control the charging circuit to charge the capacitor.

22 Claims, 4 Drawing Sheets

(56) References Cited

U.S. PATENT DOCUMENTS

| | | | |
|---|---|---|---|
| 5,734,205 A * | 3/1998 | Okamura et al. | 307/110 |
| 6,266,786 B1 | 7/2001 | Chang | |
| 6,967,890 B2 * | 11/2005 | Shen | 365/226 |
| 7,911,811 B2 | 3/2011 | Wheeler et al. | |
| 2001/0015634 A1 | 8/2001 | Shirakawa | |
| 2006/0224907 A1 * | 10/2006 | Feldman et al. | 713/300 |
| 2007/0006013 A1 * | 1/2007 | Moshayedi et al. | 714/2 |
| 2008/0129219 A1 * | 6/2008 | Smith et al. | 315/291 |
| 2010/0093223 A1 * | 4/2010 | Pappas et al. | 439/660 |
| 2010/0315046 A1 | 12/2010 | Trainor et al. | |
| 2010/0332858 A1 * | 12/2010 | Trantham et al. | 713/300 |
| 2010/0332862 A1 * | 12/2010 | Lester et al. | 713/300 |
| 2011/0031811 A1 * | 2/2011 | Park et al. | 307/66 |
| 2011/0064445 A1 * | 3/2011 | Yashiro | 399/88 |

FOREIGN PATENT DOCUMENTS

| | | |
|---|---|---|
| TW | 359829 | 6/1999 |
| TW | 522624 | 3/2003 |
| TW | 200950296 | 12/2009 |

OTHER PUBLICATIONS

Taiwanese language office action dated Jul. 28, 2014.
English language translation of relevant paragraphs of office action.
Taiwanese language office action dated Mar. 19, 2014.
English language translation of abstract of JP 07-013068 (the counterpart to TW 359829).
Chinese language office action dated Dec. 1, 2014.
English language translation of relevant paragraphs of Chinese office action.

* cited by examiner

POWER SUPPLY DEVICES AND CONTROL METHOD THEREOF

CROSS REFERENCE TO RELATED APPLICATIONS

This application claims the benefit of Taiwan application Serial No. 100129694, filed on Aug. 19, 2011, the subject matter of which is incorporated herein by reference.

BACKGROUND OF THE INVENTION

1. Field of the Invention

The invention relates to a power supply device, and more particularly to a power supply device which monitors power of a coin battery of a main system and provides backup power to maintain data in a CMOS storage area on a system chip when the power of the coin battery is insufficient and the coin battery is taken out to be replaced by a new one.

2. Description of the Related Art

Generally, a coin battery is disposed on a main board of a computer apparatus. When the computer apparatus is powered off (at this time, no stand-by power and no normal power is provided to the computer apparatus), the coin battery provides power to maintain data in a CMOS storage area on a system chip. Thus, when the computer apparatus is powered off and the coin battery provides no power, the data in the CMOS storage area on the system chip is lost because there is no power to maintain the data. When the computer apparatus is powered on at the next time, a user has to re-adjust the time of the main board and re-load a BIOS optimal setting to the computer apparatus. Current techniques provide a monitoring circuit to monitor power of the coin battery. Before the power of the coin battery is consumed completely, the monitoring circuit reminds the user to replace the coin battery with a new coin battery. However, in the process of the replacement of the coin battery, the data is lost because there is no power to maintain the data.

Thus, it is desired to provide a power supply device which is capable of monitoring power of a coin battery and providing backup power to maintain data in a CMOS storage area on a system chip when the coin battery is replaced by a new coin battery.

BRIEF SUMMARY OF THE INVENTION

An exemplary embodiment of a power supply device is provided. The power supply device provides a maintenance voltage at an output terminal to a system chip of a system. The power supply device comprises a first battery, a capacitor, a charging circuit, and a monitoring circuit. The first battery provides a battery voltage. The capacitor stores a capacitor voltage. The charging circuit is coupled to the capacitor. The monitoring circuit detects the battery voltage and the capacitor voltage. The monitoring circuit detects whether the battery voltage is less than a first threshold and whether the capacitor voltage is larger than a second threshold and generates a control signal according to the determination result. When the monitoring circuit detects that the battery voltage is less than the first threshold and the capacitor voltage is not larger than the second threshold, the monitoring circuit asserts the control signal to control the charging circuit to charge the capacitor.

In an embodiment, after the charging circuit charges the capacitor and the capacitor voltage becomes larger than the second threshold, during a time when the first battery is replaced with a second battery at an inaction state of the system, the capacitor voltage which is larger than the second threshold serves as the maintenance voltage.

In another embodiment, when the monitoring circuit detects that the battery voltage is less than the first threshold and the capacitor voltage is larger than the second threshold, the monitoring circuit de-asserts the control signal to control the charging circuit not to charge the capacitor. In this case, during the time when the first battery is replaced with a second battery at an inaction state of the system, the capacitor voltage stored in the capacitor serves as the maintenance voltage.

In further another embodiment, when the monitoring circuit detects that the battery voltage is not less than the first threshold, the monitoring circuit de-asserts the control signal to control the charging circuit not to charge the capacitor. In this case, the battery voltage of the battery serves as the maintenance voltage at an inaction state of the system.

An exemplary embodiment of a control method is provided. The power supply device provides a maintenance voltage to a system chip of a system and comprises a first battery and a capacitor. First, when the system is at an operation state, it is determined whether a battery voltage of the battery is less than a first threshold. When the battery voltage is less than the first threshold, it is determined whether a capacitor voltage of the capacitor is larger than a second threshold. When the capacitor voltage is not larger than the second threshold, the capacitor is charged, so that the capacitor voltage becomes larger than the second threshold. When the capacitor voltage is larger than the second threshold, the system is switched to be at an inaction state. At the inaction state, the capacitor voltage which is larger than the second threshold is provided to serve as the maintenance voltage, and the first battery is replaced with a second battery.

In an embodiment, when the battery voltage is not less than the first threshold, the system is switched to be at the inaction state, and the battery voltage is provided to serve as the maintenance voltage.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Computer systems are provided. In an exemplary embodiment of a computer system in FIG. 1, a computer system 1 comprises a power supply device 10 and a system chip 11. The system chip 11 comprises a CMOS storage area 110. The CMOS storage area 110 is used to store system parameters of the computer system 1, such as the time of a main board and a BIOS optimal setting. The power supply device 10 provides a maintenance voltage VBAT at an output terminal OUT to the system chip 11.

Figure 1:
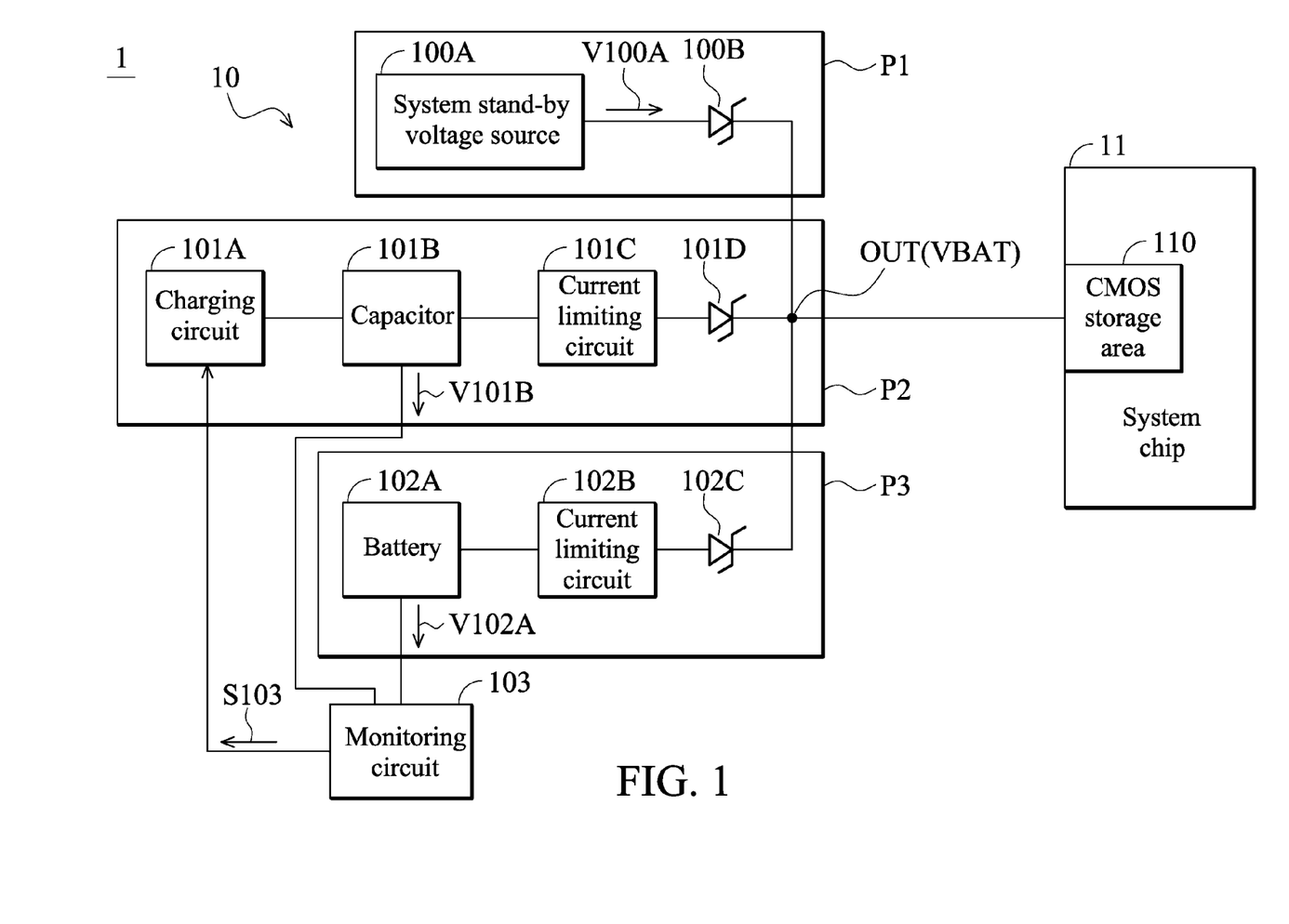
FIG. 1 shows an exemplary embodiment of a computer system.

Referring to FIG. 1, the power supply device 10 comprises three power paths. The first power path P1 is composed of a system stand-by voltage source 100A and a schottky diode 100B. The second power path P2 is composed of a charging circuit 101A, a capacitor 101B, a current limiting circuit 101C, and a schottky diode 101D. The third power path P3 is composed a battery 102A, a current limiting circuit 102B, and a schottky diode 102C. All of the three power paths are coupled to the output terminal OUT collectively. Moreover, the power supply device 10 further comprises a monitoring circuit 103 which is coupled to the capacitor 101B and the battery 102A. The monitoring circuit 103 detects a capacitor voltage stored in the capacitor 101B and a battery voltage provided by the battery 102A. In the embodiment, when normal power (that is an AC voltage from power socket) is provided to the computer system 1, the computer system 1 is at an operation state, and the system stand-by voltage source 100A provides a system stand-by voltage V100A of about 3.3V. The maximum value of the capacitor voltage V101B stored in the capacitor 101B and the maximum value of the battery voltage V102A stored by the battery 102A must be larger than the system stand-by voltage V100A. In the embodiment, the maximum value of each of the capacitor voltage V101B and the battery voltage V102A is set at about 3V.

The structures of the power paths P1~P3 will be described in the following. In the power path P1, the schottky diode 100B is coupled between the system stand-by voltage source 100A and the output terminal OUT. In the power path P2, the charging circuit 101A is coupled to one terminal of the capacitor 101B, and the other terminal of the capacitor 101B is coupled to the output terminal OUT through the current limiting circuit 101C and the schottky diode 101D. In the embodiment, the capacitor 101B is implemented by a super capacitor. In other embodiments, a capacitor which has characteristics of rapid discharging and charge storing can be implemented to serve as the capacitor 101B. In the power path P3, the battery 102A is coupled to the output terminal OUT through the current limiting circuit 102B and the schottky diode 102C. In the embodiment, the battery 102A is implemented by a coin battery. According to the above description, the power paths P1~P3 are coupled to the output terminal OUT. Thus, the amount of the maintenance voltage VBAT is determined by one of the power paths P1~P3. The detailed description of the power supply device 10 is in the following.

When the computer system 1 is at the operation state (that is a state at which the normal power is provided to the computer system 1), the system stand-by voltage source 100A provides the system stand-up voltage V100A. As described above, the voltage V100A of about 3.3V provided by the system stand-by voltage source 100A is larger than the capacitor voltage V101B stored in the capacitor 101B and the battery voltage V102A stored in the battery 102A. Thus, according to the characteristic of schottky diodes, the schottky diode of the power path P1 is turned on, while the schottky diodes 101D and 102C of the power paths P2 and P3 are turned off. At this time, the system stand-by voltage V100A is transmitted to the output terminal OUT through the turned on schottky diode 100B to serve as the maintenance voltage VBAT. In other words, when the computer system 1 is at the operation state, the maintenance voltage VBAT is determined by the power path P1.

When the computer system 1 is at the operation state, the monitoring circuit 103 detects the capacitor voltage V101B of the capacitor 101B and the battery voltage V102A of the battery 102A to generate a control signal S103. The monitoring circuit 103 initially de-asserts the control signal S103 (that is the control signal S103 is initially at a de-asserted state). In an embodiment, before the computer system 1 is switched to be at an inaction state (that is a state in which the normal power is not provided to the computer system 1) from the operation state, the monitoring circuit 103 detects the capacitor voltage V101B and the battery voltage V102A. The recited inaction state is a state at which the normal power is not provided to the computer system 1. Thus, at the inaction state, the system stand-by voltage source 100A stops providing the system stand-up voltage V100A. In another embodiment, at the operation state, the monitoring circuit 103 continuously detects the capacitor voltage V101B and the battery voltage V102A. According to the operation of detecting the capacitor voltage V101B and the battery voltage V102A by the monitoring circuit 103, the monitoring circuit 103 can determine whether the battery voltage V102A is less than a first threshold value and whether the capacitor voltage V101B is larger than a second threshold value and assert or continuously de-assert the control signal S103 according to the determination result. The first threshold value is determined according to system requirements. In the embodiment, the first threshold value is set to be not less the 2V.

When the monitoring circuit 103 determines that the battery voltage V102A is not less than the first threshold, it is obtained that the voltage of the battery 102A is sufficient to maintain the system parameters in the CMOS storage area. At this time, regardless of whether the capacitor voltage V101B is larger than the second threshold value, the monitoring circuit 103 continuously de-asserts the control signal S103 (that is the control signal S103 remains at the de-asserted state) to control the charging circuit 101A not to charge the capacitor 101B. According to the above description, in the case that the voltage of the battery 102A is sufficient to maintain the system parameters in the CMOS storage area, the charging circuit 101A does not charge the capacitor 101B, thereby preventing the lifespan of the capacitor 101 from being shorten due to unnecessary charging and/or discharging. Moreover, since the charging circuit 101A does not charge the capacitor 101B, the capacitor 101B can be discharged before the computer system 1 is switched to be at the inaction state. When the capacitor 101B is not discharged completely and stores remaining charges, the circuit board of the computer system 1 may be shorted due to fabrication and transportation. Thus, in the embodiment, when the voltage of the battery 102A is sufficient to maintain the system parameters in the CMOS storage area, the monitoring circuit 103 is required to determine whether the capacitor 101B is discharged completely.

In the embodiment, the de-asserted control signal S103 has a high voltage level. After, when the computer system 1 is switched to be at the inaction state from the operation state, the system stand-by voltage source 100A stops providing the system stand-up voltage V100A. According to the characteristic of schottky diodes, the schottky diodes 100B and 101D of the power paths P1 and P2 are turned off, while the schottky diode 102C of the power path P3 is turned on. At this time, the battery voltage V102A is transmitted to the output terminal OUT through the current limiting circuit 102B and the turned-on schottky diode 102C to serve as the maintenance voltage VBAT. In other words, when the computer system 1 is at the inaction state and the battery V102A provides a sufficient voltage, the maintenance voltage VBAT is determined by the power path P3. At this time, the CMOS storage area 110 receives the sufficient maintenance voltage VBAT, so that the stored system parameters can be maintained in the CMOS storage area without being lost during the inaction state.

When the monitoring circuit 103 determines that the battery voltage V102A is less than the first threshold voltage, it is obtained that the voltage of the battery 102A is about to run out, and a new battery is required to replace the battery 102A. At this time, the monitoring circuit 103 records this situation and notifies the user that the battery 102A is required to be replaced when the computer system 1 is switched to be at the inaction state at a next period. According to the embodiment, the monitoring circuit 103 determines whether the capacitor voltage V101B is larger than the second threshold before the computer system 1 is switched to be at the inaction state, or the monitoring circuit 103 continuously determines whether the capacitor voltage V101B is larger than the second threshold at the operation state. In an embodiment, when the monitoring circuit 103 determines that the capacitor voltage V101B is larger than the second threshold, the monitoring circuit 103 continuously de-asserts the control signal S103 (that is the control signal S103 is continuously at the de-asserted state) to control the charging circuit 101A not to charge the capacitor 101B. After, when the computer system 1 is switched to be at the inaction state from the operation state, since the normal power is not provided to the computer system 1, the system stand-by voltage source 100A stops providing the system stand-up voltage V100A. At the inaction state, the user can take out the battery 102A and replace the battery 102A with a new battery. Since the system stand-by voltage source 100A stops providing the system stand-up voltage V100A and the battery 102 is taken out, according to the characteristic of schottky diodes, the schottky diodes 100B and 102C of the power paths P1 and P3 are turned off, while the schottky diode 101D of the power path P2 is turned on. During the time when the battery 102A is taken out to be replaced with a new battery, the capacitor voltage V101B is transmitted to the output terminal OUT through the current limiting circuit 101C and the turned-on schottky diode 101D serves as the maintenance voltage VBAT.

In another embodiment, when the monitoring circuit 103 determines that the battery voltage V102A is less than the first threshold and the capacitor voltage is not larger than the second threshold at the same time, then, the monitoring circuit 103 asserts the control signal S103 (that is the control signal S103 is switched to be at the asserted state) to control the charging circuit 101A to charge the capacitor 101B. In the embodiment, the asserted control signal has a low voltage level. The charging circuit 101A charges the capacitor 101B, so that the capacitor voltage V101B becomes larger than the second threshold. After the charging circuit 101A finishes charging the capacitor 101B, the monitoring circuit 103 de-asserts the control signal S103 (that the control signal S103 is switched to be at the de-asserted state). After, when the computer system 1 is switched to be at the inaction state from the operation state, the system stand-by voltage source 100A stops providing the system stand-up voltage V100A. At the inaction state, the user can take out the battery 102A and replace the battery 102A with a new battery. Since the system stand-by voltage source 100A stops providing the system stand-up voltage V100A and the battery 102 is taken out, according to the characteristic of schottky diodes, the schottky diodes 100B and 102C of the power paths P1 and P3 are turned off, while the schottky diode 101D of the power path P2 is turned on. During the time when the battery 102A is taken out to be replaced with a new battery, the capacitor voltage V101B of the charged capacitor 101B (the capacitor voltage V101B is larger than the second threshold) is transmitted to the output terminal OUT through the current limiting circuit 101C and the turned-on schottky diode 101D to serve as the maintenance voltage VBAT.

According to the above description, during the time when the battery 102A is taken out to be replaced with a new battery at the inaction state of the computer system 1, the maintenance voltage VBAT is determined by the power path P2. In other words, when the battery 102A can not provide a sufficient voltage at the inaction state of the computer system 1, the power supply device 10 provides the capacitor voltage V101B which is larger than the second threshold voltage to serve as the maintenance voltage VBAT. At this time, the CMOS storage area 110 receives the sufficient maintenance voltage VBAT, so that the stored system parameters can be maintained in the CMOS storage area without being lost during the inaction state.

According to the above embodiment, when the computer system 1 is at the inaction state, the power supply device 10 can provide a sufficient voltage through the battery 102A of the power pace P3 or the capacitor 101B of the power path P2 to serve as the maintenance voltage VBAT, so that the stored system parameters can be maintained in the CMOS storage area without being lost during the inaction state. Particularly, when the battery voltage V102A of the battery 102A is not sufficient to maintain the system parameters in the CMOS storage area 110 and the battery 102A is required to be replaced with a new battery, the power supply device 10 is switched to provide sufficient capacitor voltage V101B from the capacitor 101B of the power path P2 to serve as the maintenance voltage VBAT during the replacement of the battery 102A. Thus, when the replacement of the battery 102A is being performed, the system parameters stored in the CMOS storage area 110 can be maintained. After the replacement of the battery 102A is accomplished, according to the characteristic of schottky diodes, the capacitor voltage V101B, and the voltage of the new battery, the power supply device 10 can continuously provide the capacitor voltage V101B of the capacitor 101B to serve as the maintenance voltage VBAT or be switched to provide the voltage of the new battery to serve as the maintenance voltage VBAT.

Figure 2:
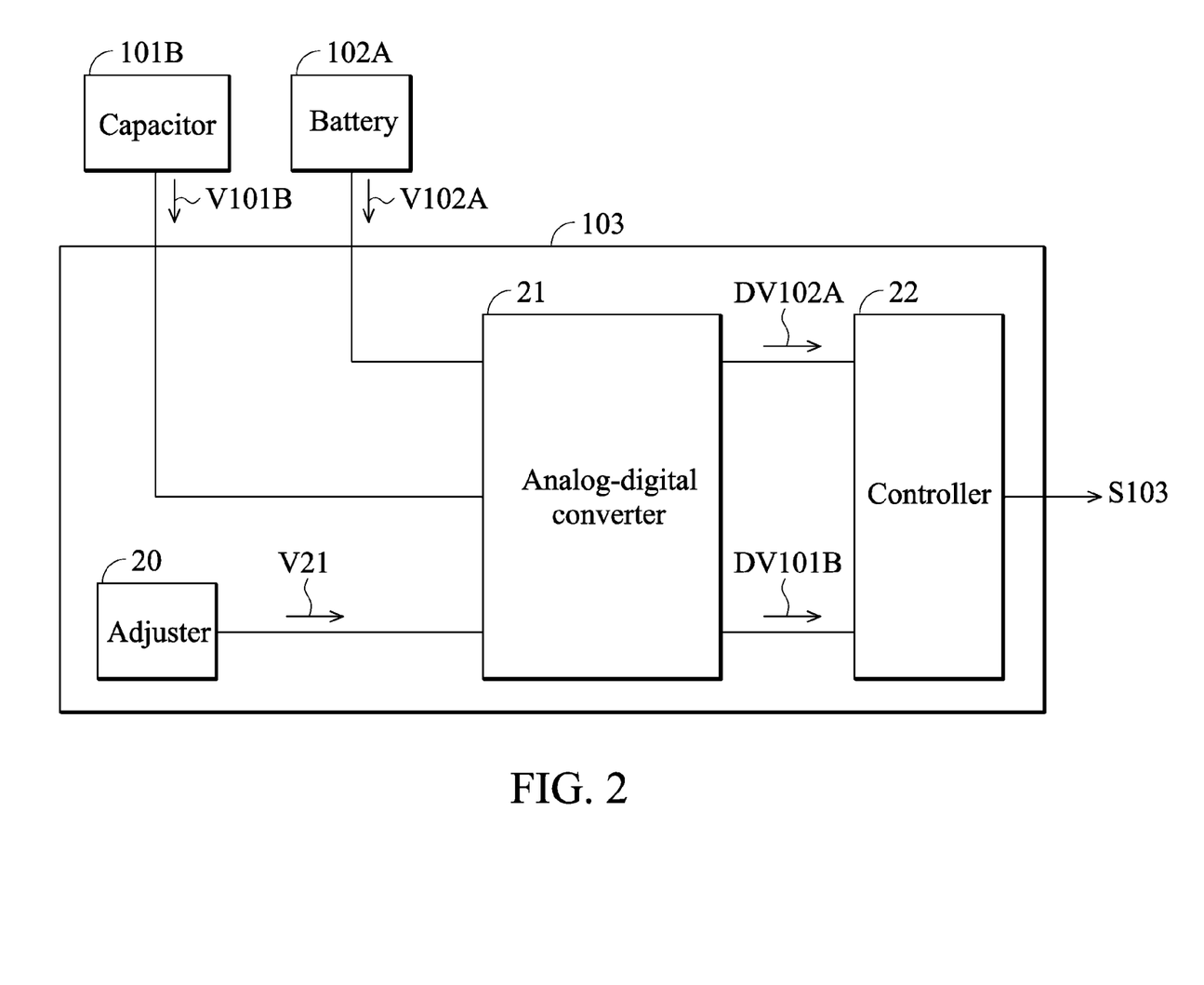
FIG. 2 shows an exemplary embodiment of a monitoring circuit in the computer system of FIG. 1.

FIG. 2 shows an exemplary embodiment of the monitoring circuit 103. Referring to FIG. 2, in order to describe the structure and operation of the monitoring circuit 103 clearly, FIG. 2 also shows the battery 102A and the capacitor 101B. The monitoring circuit 103 comprises an adjuster 20, an analog-digital converter 21, and a controller 22. The adjuster 20 is used to provide a reference voltage V21 to the analog-digital converter 21 to serve as a reference level for the analog-digital converter 21. The analog-digital converter 21 receives the battery voltage V102A, the capacitor voltage V101B, and the reference voltage V21. The analog-digital converter 21 converts the battery voltage V102A to a digital voltage signal DV102A and converts the capacitor voltage V101B to another digital voltage signal DV101B according to the reference voltage V21. The controller 22 receives the digital voltage signals DV102A and DV101B and generates the control signal S103. The controller 22 determines whether the battery voltage V102A is less than the first threshold according to the value represented by the digital voltage signal DV102A and whether the capacitor voltage V101B is larger than the second threshold according to the value represented by the digital voltage signal DV101B. The controller 22 asserts the control signal S103 or continuously de-asserts the control signal S103 according to the determination result. When the controller 22 determines that the battery voltage V102A is not less than the first threshold or when the controller 22 determines that the battery voltage 102A is less than the first threshold and the capacitor voltage V101B is larger than the second threshold, the controller 22 de-asserts the control signal S103. When the controller 22 determines that the battery voltage 102A is less than the first threshold and the capacitor voltage V101B is not larger than the second threshold, the controller 22 asserts the control signal S103 (that is the control signal S103 is switched to be at the asserted state). After the charging operation performed to the capacitor 101B is accomplished, the controller 22 de-asserts the control signal S103 (that is the control signal S103 is switched to be at the de-asserted state). In the embodiment, the monitoring circuit 103 may be implemented by a battery monitoring circuit (MBC).

Figure 3:
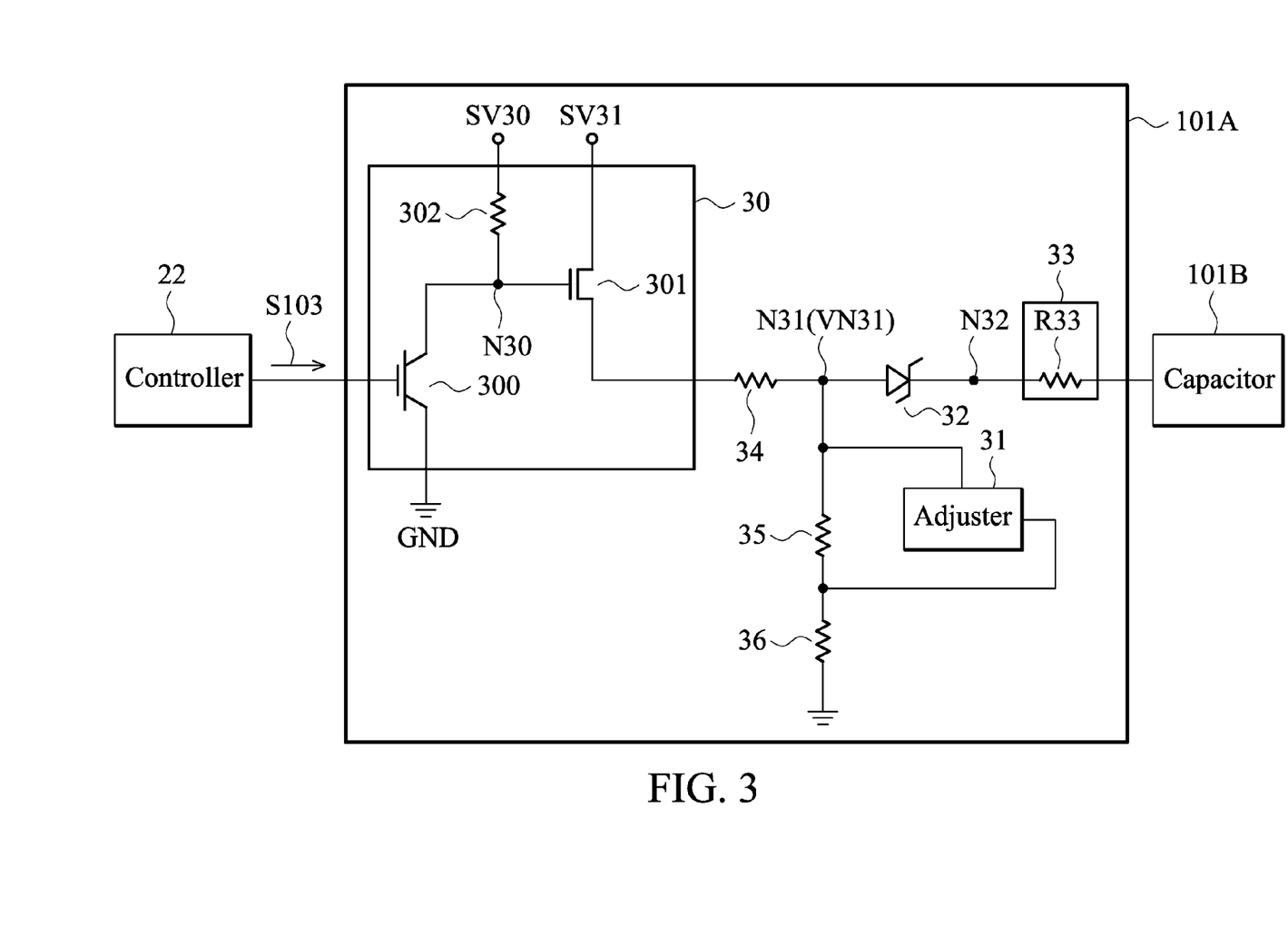
FIG. 3 shows an exemplary embodiment of a charging circuit in the computer system of FIG. 1.

FIG. 3 shows an exemplary embodiment of the charging circuit 101A. Referring to FIG. 3, in order to describe the structure and operation of the charging circuit 101A, FIG. 3 also shows the capacitor 101B and the controller 22 of the monitoring circuit 103. The charging circuit 101A comprises a switch unit 30, an adjuster 31, a schottky diode 32, a current limiting circuit 33, and resistors 34-36. The switch unit 30 comprises transistors 300 and 301 and a resistor 302. In the embodiment, the transistor 300 is implemented by an npn bipolar junction transistor (BJT), while the transistor 301 is implemented by an N-type metal oxide semiconductor (MOS) transistor. A control terminal (base) of the transistor 300 receives the control signal S103 from the controller 22, an input terminal (collector) thereof is coupled to a node N30, and an output terminal (emitter) thereof is coupled to a reference ground GND. A control terminal (gate) of the transistor 301 is coupled to the node N30, an input terminal (drain) thereof is coupled to a system stand-by voltage source SV31, and an output terminal (source) thereof is coupled to a node N31 through the resistor 34. The resistor 302 is coupled between a system stand-by voltage source SV30 and the node N30. In the embodiment, according to the stand-by power, the system stand-by voltage source SV30 provides a voltage with about 12V, and the system stand-by voltage source SV31 provides a voltage with about 3.3V. The adjuster 31 is coupled to the node N31. The schottky diode 32 is coupled between the node N31 and a node N32. The current limiting circuit 33 is coupled between the node N32 and the capacitor 101B. In the embodiment, the current limiting circuit 33 is implemented by a resistor R33.

When the controller 22 determines that the battery voltage V102A is not less than the first threshold or when the controller 22 determines that the battery voltage 102A is less than the first threshold and the capacitor voltage V101B is larger than the second threshold, the controller 22 de-asserts the control signal S103 (that is the control signal S103 remains at the de-asserted state). The transistor 300 is turned on according to the de-asserted control signal S103 with the high voltage level. At this time, through the resistor 302 and the turned-on transistor 300, a charging path is formed between the system stand-by voltage source SV30 and the reference ground GND. The node N30 is at a low voltage level to turn off the transistor 301. Since the transistor 301 is turned off, the switch unit 30 can not provide the voltage of the system stand-by voltage source SV31 to charge the capacitor 101B.

When the controller 22 determines that the battery voltage 102A is less than the first threshold and the capacitor voltage V101B is not larger than the second threshold, the controller 22 asserts the control signal S103 (that is the control signal S103 is switched to be at the asserted state). The transistor 300 is turned off according to the asserted control signal S103 with the low voltage level. At this time, the node N30 is at a high voltage level according to the voltage of the system stand-by voltage source SV30 to turn on the transistor 301. Since the transistor 301 is turned on, the voltage of the voltage of the system stand-by voltage source SV31 is provided to the node N31 through the resistor 34, so that the node N31 has a charge voltage VN31. The adjuster 31 is coupled to the node N31 and stabilizes the charge voltage VN31 to be at a predetermined level. The charge voltage VN31 with the predetermined level is used to charge the capacitor 101B through the schottky diode 32 and the current limiting circuit 33. In the embodiment, the predetermined level is a voltage level of about 3.3V. By varying the ratio of the resistance values of the resistors 35 and 36, the adjuster 31 can selectively adjust the magnitude of the predetermined level.

According to the above embodiment, during the time when the battery 102A with an insufficient voltage is taken out to be replaced with a new battery at the inaction state, the capacitor voltage V101B serves as the maintenance voltage VBAT. Note that, when the computer system 1 is switched to be at the inaction state, the replacement of the battery 102A has to be accomplished before the capacitor voltage V101B is consumed. The time period for the replacement of the battery 102A occurring after the computer system 1 is switched to the inaction state is determined according to the second threshold, the size of the capacitor 101B (that is the capacitance value of the capacitor 101B), and the power consumption required by the computer system 1 being at the inaction state. For example, it is assumed that the second threshold is 3V, the capacitance value of the capacitor 101B is 0.68 F, and the power consumption required to maintain the system parameters in the CMOS storage area in the active state is 2.13 uA. In theory, according to the equation (1), the time period for the capacitor voltage V101B to be lowered to 2V from 3V can be obtained.

$$C = \frac{I(T2-T1)}{V1-V2} \quad (1)$$

wherein, V1=3V, V2=2V, I=2.13 uA, and C=0.68 F. Thus, it is obtained that the time period (T2-T1) is equal to 1408.45 hours Table 1 shows the relationship between the capacitor voltage V101B which is measured in practice and the elapsed time when the capacitor 101B is discharged.

TABLE 1

| the discharging elapsed time | the capacitor voltage V101B |
| --- | --- |
| 0 second | 3.005 V |
| 6 seconds | 2.986 V |
| 36 seconds | 2.812 V |
| 66 seconds | 2.751 V |
| 96 seconds | 2.695 V |
| 126 seconds | 2.64 V |
| 156 seconds | 2.575 V |
| 186 seconds | 2.505 V |
| 216 seconds | 2.435 V |
| 246 seconds | |

Note that the equivalent resistor of the capacitor 101B may participate in the discharging operation. Thus, when the loading current is small, the equation (1) is not appropriate.

In some embodiments, when the replacement of the battery 102A is accomplished, the user can switch the computer system 1 to be at the operation state to check whether the system parameters in the CMOS storage area 110 still exists, thereby confirming whether the replacement of the battery 102A has been performed successfully.

Figure 4:
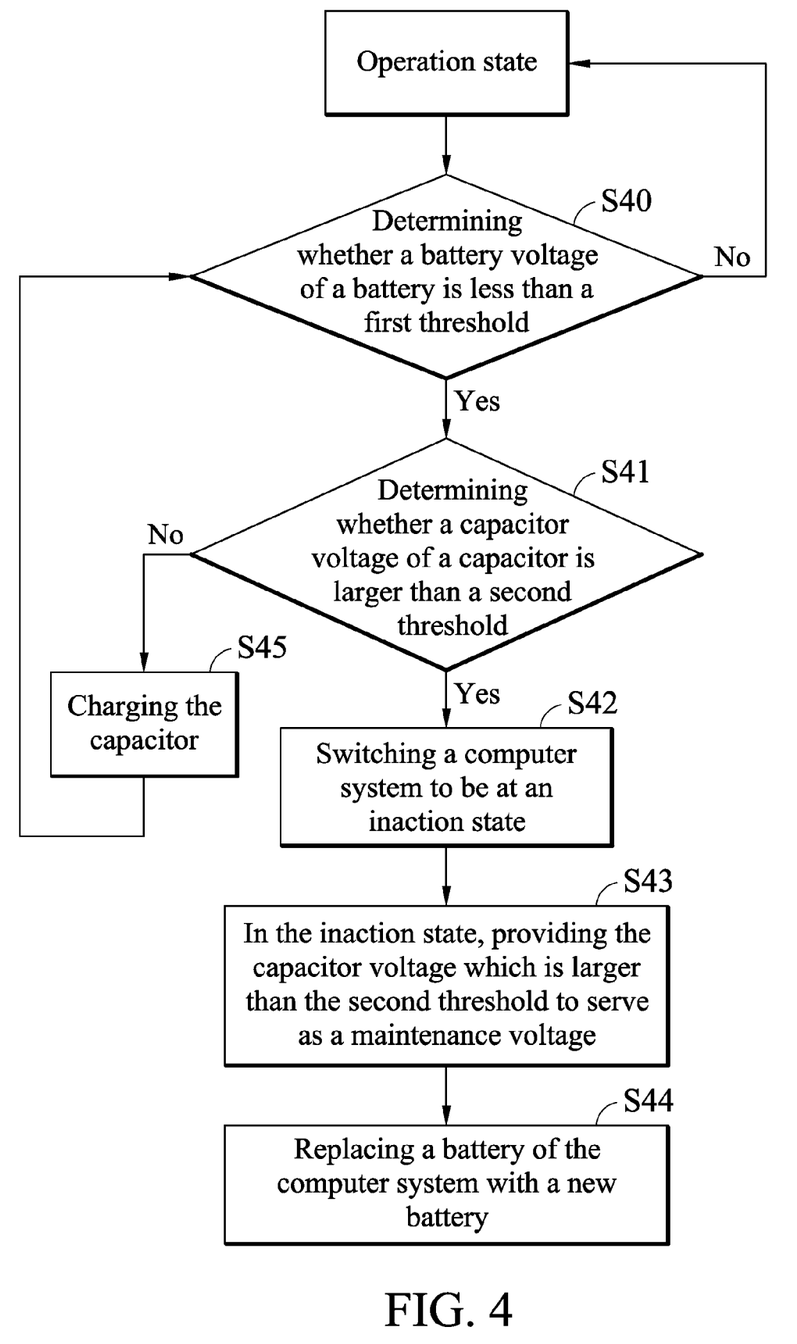
FIG. 4 is a flow chart of a control method for a power supply device.

FIG. 4 is a flow chart of a control method for the power supply device 10 of FIG. 1. First, when the computer system 1 is at the operation state, the monitoring circuit 103 determines whether the battery voltage V102A of the battery 102A is less than the first threshold (step S40). When the monitoring circuit 103 determines that the battery voltage V101A is not less than the first threshold, the monitoring circuit 103 may continuously determine whether the battery voltage V102A of the battery 102A is less than the first threshold at the operation state or may determine whether the battery voltage V102A of the battery 102A is less than the first threshold before the computer system 1 is switched to the inaction state. In the case that the battery 102A is not less than the first threshold, when the computer system 1 is switched into the inaction state, the battery voltage V102A provided by the battery 102A serves as the maintenance voltage VBAT to be provided to the CMOS storage area 110 of the system chip 11.

When the monitoring circuit 103 determines that the battery voltage V102A is less than the first threshold, the monitoring circuit 103 then determines whether the capacitor voltage V101B of the capacitor 101B is larger than the second threshold (step S41). When the monitoring circuit 103 determines that the capacitor voltage V101 is larger than the second threshold, in the case that the computer system 1 is switched to be at the inaction state (step S42), the capacitor 101B provides the capacitor voltage V101B which is larger than the second threshold to serve as the maintenance voltage VBAT (step S43). After, the user can replace the battery 102A with a new battery (step S44). When the monitoring circuit 103 determines that the capacitor voltage V101B is not larger than the second threshold, the charging circuit 101A charges the capacitor 101B (step S45). Then, the method returns to the step S41, and the monitoring circuit 103 determines whether the capacitor voltage V101B of the capacitor 101B is larger than the second threshold again. When the monitoring circuit 103 determines that the capacitor voltage V101B of the capacitor 101B is larger than the second threshold through the charging operation of the charging circuit 101A, the method proceeds to the steps S42-S44.

According to the embodiment, when the computer system 1 is at the inaction state, the battery 102A or the capacitor 101B provides a sufficient voltage to serve as the maintenance voltage VBAT. Particularly, when the battery voltage V102A of the battery 102A is not sufficient to maintain the system parameters in the CMOS storage area and a new battery is required to replace the battery 102A, the capacitor 101B is used to provide the sufficient capacitor voltage V101B to serve as the maintenance voltage VBAT during the replacement of the battery 102A. Thus, when replacing the battery 102A, the system parameters in the CMOS storage area 110 are still maintained.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power supply device for providing a maintenance voltage at an output terminal to a system chip of a system comprising:
   a first battery for providing a battery voltage;
   a capacitor for storing a capacitor voltage;
   a charging circuit coupled to the capacitor; and
   a monitoring circuit for detecting the battery voltage and the capacitor voltage,
   wherein the monitoring circuit detects whether the battery voltage is less than a first threshold and whether the capacitor voltage is larger than a second threshold and generates a control signal according to the determination result, and
   wherein when the monitoring circuit detects that the battery voltage is less than the first threshold and the capacitor voltage is not larger than the second threshold, the monitoring circuit asserts the control signal to control the charging circuit to charge the capacitor;
   wherein when the monitoring circuit detects that the battery voltage is less than the first threshold and the capacitor voltage is larger than the second threshold, the monitoring circuit de-asserts the control signal to control the charging circuit not to charge the capacitor.

2. The power supply device as claimed in claim 1, wherein after the charging circuit charges the capacitor and the capacitor voltage becomes larger than the second threshold, during a time when the first battery is replaced with a second battery at an inaction state of the system, the capacitor voltage which is larger than the second threshold serves as the maintenance voltage.

3. The power supply device as claimed in claim 1, wherein when the monitoring circuit detects that the battery voltage is less than the first threshold and the capacitor voltage is larger than the second threshold, during the time when the first battery is replaced with a second battery at an inaction state of the system, the capacitor voltage stored in the capacitor serves as the maintenance voltage.

4. The power supply device as claimed in claim 1, wherein when the monitoring circuit detects that the battery voltage is not less than the first threshold, the monitoring circuit de-asserts the control signal to control the charging circuit not to charge the capacitor.

5. The power supply device as claimed in claim 4, wherein when the monitoring circuit detects that the battery voltage is not less than the first threshold, the battery voltage of the first battery serves as the maintenance voltage at an inaction state of the system.

6. The power supply device as claimed in claim 1 further comprising:
   a system stand-by voltage source for providing a system stand-by voltage to serve as the maintenance voltage at an operation state of the system.

7. The power supply device as claimed in claim 6 further comprising:
   a schottky diode coupled between the system stand-by voltage source and the output terminal.

8. The power supply device as claimed in claim 1 further comprising:
   a first schottky diode coupled between the first battery and the output terminal; and
   a second schottky diode coupled between the capacitor and the output terminal.

9. The power supply device as claimed in claim 1 further comprising:
   a first current limiting circuit coupled between the first battery and the output terminal; and
   a second current limiting circuit coupled between the capacitor and the output terminal.

10. The power supply device as claimed in claim 1, wherein the monitoring circuit determines the battery voltage and the capacitor voltage at an operation state of the system.

11. The power supply device as claimed in claim 1, wherein the capacitor is implemented by a super capacitor.

12. The power supply device as claimed in claim 1, wherein the first battery is implemented by a coin battery.

13. The power supply device as claimed in claim 1, wherein the monitoring circuit comprises:
   an adjuster for providing a reference voltage;
   an analog-digital converter for receiving the battery voltage, the capacitor voltage, and the reference voltage, wherein the analog-digital converter converts the battery voltage to a first digital voltage signal and converts the capacitor voltage to a second digital voltage signal according to the reference voltage; and
   a controller for receiving the first digital voltage signal and the second digital voltage signal and determining whether the battery voltage is less than the first threshold and whether the capacitor voltage is larger than the second threshold according to the first digital voltage signal and the second digital voltage signal respectively,
   wherein when the monitoring circuit detects that the battery voltage is less than the first threshold and the capacitor voltage is not larger than the second threshold, the controller asserts the control signal.

14. The power supply device as claimed in claim 13, wherein when the monitoring circuit detects that the battery voltage is less than the first threshold and the capacitor voltage is larger than the second threshold or that the battery voltage is not less than the first threshold, the controller de-asserts the control signal to control the charging circuit not to charge the capacitor.

15. The power supply device as claimed in claim 1, wherein the charging circuit comprises:
   a switch unit controlled by the control signal and coupled to the capacitor at a first node, wherein when the monitoring circuit asserts the control signal, the switch unit provides a voltage of a first system stand-by voltage source, so that the first node has a charge voltage; and
   an adjuster for stabilizing the charge voltage to be at a predetermined level, wherein the charging circuit charges the capacitor according to the charge voltage with the predetermined level.

16. The power supply device as claimed in claim 15, wherein when the monitoring circuit detects that the battery voltage is less than the first threshold and the capacitor voltage is larger than the second threshold or that the battery voltage is not less than the first threshold, the monitoring circuit de-asserts the control signal, and the switch unit does not provide the voltage of the first system stand-by voltage source according to the de-asserted control signal.

17. The power supply device as claimed in claim 15, wherein the switch unit comprises:
   a first transistor having a control terminal receiving the control signal, an input terminal coupled to a second system stand-by voltage source at a second node, and an output terminal coupled to a reference ground; and
   a second transistor having a control terminal coupled to the second node, an input terminal coupled to the first system stand-by voltage source, and an output terminal coupled to the first node,
   wherein when the control signal is asserted, the first transistor is turned off, and the second transistor is turned on according to a voltage of the second system stand-by voltage source.

18. The power supply device as claimed in claim 15, wherein the charging circuit further comprises:
   a schottky diode coupled between coupled between the first node and a third node; and
   a current limiting circuit coupled between the third node and the capacitor.

19. A control method for a power supply device, wherein the power supply device provides a maintenance voltage to a system chip of a system and comprises a first battery and a capacitor, the control method comprises:
   determining whether a battery voltage of the first battery is less than a first threshold when the system is at an operation state;
   when the battery voltage is less than the first threshold, determining whether a capacitor voltage of the capacitor is larger than a second threshold;
   when the capacitor voltage is not larger than the second threshold, charging the capacitor, so that the capacitor voltage becomes larger than the second threshold;
   when the capacitor voltage is larger than the second threshold, switching the system to be at an inaction state; and
   at the inaction state, providing the capacitor voltage which is larger than the second threshold to serve as the maintenance voltage and replacing the first battery with a second battery.

20. The control method as claimed in claim 19 further comprising
   when the battery voltage is not less than the first threshold, switching the system to be at the inaction state; and
   providing the battery voltage to serve as the maintenance voltage.

21. The power supply device as claimed in claim 1, further comprising:
   a first power path, coupled to the output terminal, having a system voltage source to provide power to the output terminal;
   a second power path, coupled to the output terminal, having the first battery to selectively provide the battery voltage to the output terminal; and
   a third power path, coupled to the output terminal, having the capacitor to selectively provide the capacitor voltage to the output terminal.

22. The power supply device as claimed in claim 21, wherein
   the first path further have a first diode device, coupled between the system voltage source and the output terminal;
   the second power path further have a second diode device, coupled between the first battery and the output terminal; and
   the third power path further have a third diode device, coupled between the capacitor and the output terminal.

* * * * *